(12) United States Patent
Akasaka et al.

(10) Patent No.: US 10,847,945 B2
(45) Date of Patent: Nov. 24, 2020

(54) PHASE SHIFTER FOR AN OPTICAL PHASE-SENSITIVE AMPLIFIER

(71) Applicant: Fujitsu Limited, Kawasaki-shi, Kanagawa (JP)

(72) Inventors: Youichi Akasaka, Plano, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 413 days.

(21) Appl. No.: 15/868,703

(22) Filed: Jan. 11, 2018

(65) Prior Publication Data
US 2019/0214782 A1    Jul. 11, 2019

(51) Int. Cl.
| | |
|---|---|
| H01S 3/10 | (2006.01) |
| G02B 6/02 | (2006.01) |
| H01S 3/30 | (2006.01) |
| G02F 1/365 | (2006.01) |
| H04J 14/02 | (2006.01) |
| H01S 3/067 | (2006.01) |
| H01S 3/00 | (2006.01) |
| H01S 3/13 | (2006.01) |
| H04B 10/67 | (2013.01) |

(52) U.S. Cl.
CPC ...... *H01S 3/10053* (2013.01); *G02B 6/02085* (2013.01); *G02B 6/02195* (2013.01); *G02F 1/365* (2013.01); *H01S 3/1003* (2013.01); *H01S 3/302* (2013.01); *H01S 3/0078* (2013.01); *H01S 3/06758* (2013.01); *H01S 3/1307* (2013.01); *H04B 10/67* (2013.01); *H04J 14/0201* (2013.01)

(58) Field of Classification Search
CPC ............ G02B 6/02195; G02B 6/022; G02B 6/02204; G02B 6/02085; H01S 3/10053
See application file for complete search history.

(56) References Cited

U.S. PATENT DOCUMENTS

| | | | |
|---|---|---|---|
| 9,997,887 B1* | 6/2018 | Akasaka | H04B 10/2519 |
| 10,498,102 B2* | 12/2019 | Akasaka | H01S 3/1001 |
| 2012/0086934 A1* | 4/2012 | Digonnet | G01J 1/4228 356/32 |
| 2014/0043674 A1 | 2/2014 | Takasaka et al. | |
| 2016/0172818 A1* | 6/2016 | Takasaka | H04B 10/294 359/330 |
| 2016/0274298 A1* | 9/2016 | Luo | G02B 6/124 |

OTHER PUBLICATIONS

Falah et al. "Simple beam-bending package for tunable phase shift in fiber Bragg gratings", Proceedings of 2014 5th International Conference on Photonics (ICP), Kuala Lumpur, Sep. 2-4, 2014, pp. 26-28. (Year: 2014).*
Notice of Allowance for U.S. Appl. No. 15/426,811, dated Feb. 12, 2018; 14 pages.
"Fiber Bragg grating." Wikipedia, Wikimedia Foundation, Dec. 18, 2017, en.wikipedia.org/wiki/Fiber_Bragg_grating; 14 pages.
"Reinforced FBG Sensors Serve Demanding Applications." Technica, Dec. 18, 2017, technicasa.com/reinforced-fbg-sensors-serve-demanding-applications/; Published Sep. 22, 2016. 10 pages.

* cited by examiner

*Primary Examiner* — Eric L Bolda
(74) *Attorney, Agent, or Firm* — Baker Botts L.L.P.

(57) ABSTRACT

An FBG element is configured to apply a phase shift to at least one of an input optical signal, a first pump light, and an idler signal between stages of a phase sensitive amplifier. The FBG element is apodized using a trapezoidal apodization function over the length of the first FBG element to enable tuning of the phase shift over a range of $2\pi$ radians.

19 Claims, 9 Drawing Sheets

1000 — METHOD FOR PHASE SHIFTING USING AN FBG WITH TRAPEZOIDAL APODIZATION

1002
RECEIVING AN INPUT OPTICAL SIGNAL AT A PSA STAGE I, THE PSA STAGE I COMPRISING A FIRST NLE

1004
TRANSMITTING THE INPUT OPTICAL SIGNAL AND A FIRST PUMP LIGHT THROUGH THE FIRST NLE TO GENERATE A PSA STAGE I OPTICAL SIGNAL COMPRISING THE INPUT OPTICAL SIGNAL, THE FIRST PUMP LIGHT, AND AN IDLER SIGNAL GENERATED USING THE FIRST NLE

1006
TRANSMITTING THE PSA STAGE I OPTICAL SIGNAL THROUGH AN FBG, WHERE THE FBG INCLUDES A PLURALITY OF FBG ELEMENTS, INCLUDING A FIRST FBG ELEMENT CONFIGURED TO APPLY A FIRST PHASE SHIFT TO AT LEAST ONE OF THE INPUT OPTICAL SIGNAL, THE FIRST PUMP LIGHT, AND THE IDLER SIGNAL, AND WHERE THE FIRST FBG ELEMENT IS APODIZED USING A TRAPEZOIDAL APODIZATION FUNCTION OVER THE LENGTH OF THE FIRST FBG ELEMENT, THE TRAPEZOIDAL APODIZATION FUNCTION ENABLING TUNING OF THE FIRST PHASE SHIFT OVER A RANGE OF $2\pi$ RADIANS

1008
OUTPUTTING THE PSA STAGE I OPTICAL SIGNAL WITH THE FIRST PHASE SHIFT AS A PSA STAGE II OPTICAL SIGNAL, WHERE THE INPUT OPTICAL SIGNAL, THE FIRST PUMP LIGHT, AND THE IDLER SIGNAL ARE PHASE-MATCHED IN THE PSA STAGE II OPTICAL SIGNAL

FIG. 10

PHASE SHIFTER FOR AN OPTICAL PHASE-SENSITIVE AMPLIFIER

BACKGROUND

Field of the Disclosure

The present disclosure relates generally to optical communication networks and, more particularly, to a phase shifter for an optical phase-sensitive amplifier.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

Optical networks may also include various optical elements, such as amplifiers, dispersion compensators, multiplexer/demultiplexer filters, wavelength selective switches (WSS), optical switches, couplers, etc. to perform various operations within the network. In particular, optical networks may include costly optical-electrical-optical (O-E-O) regeneration at colorless, directionless, contentionless reconfigurable optical add-drop multiplexers (CDC ROADMs) when the reach of an optical signal is limited in a single optical path.

As data rates for optical networks continue to increase, reaching up to 1 terabit/s (1 T) and beyond, the demands on optical signal-to-noise ratios (OSNR) also increase, for example, due to the use of advanced modulation formats, such as QAM and PSK with dual polarization. In particular, noise accumulations resulting from cascading of optical amplifiers in an optical network operating at very high data rates may limit the reach of an optical signal at a desired level of OSNR and may result in an increased number of O-E-O regenerations, which is economically disadvantageous.

SUMMARY

In one aspect, an optical system for phase-sensitive amplification of optical signals is disclosed. The optical system may include an input optical signal and a phase-sensitive amplifier (PSA) stage I receiving the input optical signal. In the optical system, the PSA stage I may include a first non-linear optical element (NLE) through which the input optical signal and a first pump light are passed to generate a PSA stage I optical signal comprising the input optical signal, the first pump light, and an idler signal generated using the first NLE. The optical system may further include a fiber Bragg grating (FBG) receiving the PSA stage I optical signal. In the optical system, the FBG may include a plurality of FBG elements, further including a first FBG element configured to apply a first phase shift to at least one of the input optical signal, the first pump light, and the idler signal. In the optical system, the FBG may be apodized using a trapezoidal apodization function over the length of the first FBG element, the trapezoidal apodization function enabling tuning of the first phase shift over a range of $2\pi$ radians. In the optical system, the FBG may output the PSA stage I optical signal with the first phase shift as a PSA stage II optical signal, while the input optical signal, the first pump light, and the idler signal may be phase-matched in the PSA stage II optical signal.

In any of the disclosed embodiments, the optical system may further include a PSA stage II receiving the PSA stage II optical signal. In the optical system, the PSA stage II may include a second NLE through which the PSA stage II optical signal is amplified to generate an output optical signal.

In any of the disclosed embodiments, the PSA stage II may further include a Raman amplifier, and a second pump light for transmission through the Raman amplifier in a counter propagating direction to the PSA stage II signal.

In any of the disclosed embodiments of the optical system, the input optical signal may include one optical channel, while the first FBG element may apply the first phase shift to the first pump light.

In any of the disclosed embodiments of the optical system, the input optical signal may include a wavelength division multiplexed (WDM) optical signal, further including a first optical channel, while the first FBG element may apply the first phase shift to a first idler signal that is a conjugate of the first optical channel.

In any of the disclosed embodiments, the optical system may further include a first heating element associated with the first FBG element, where the first heating element may be used to control a local temperature of the first FBG element to control the first phase shift.

In any of the disclosed embodiments, the optical system may further include a plurality of heating elements respectively corresponding to the FBG elements, where each of the FBG elements may apply a respective phase shift to the PSA stage I optical signal.

In any of the disclosed embodiments, the optical system may further include a first tension element associated with the first FBG element, where the first tension element may be used to control a local strain of the first FBG element to control the first phase shift.

In any of the disclosed embodiments, the optical system may further include a plurality of tension elements respectively corresponding to the FBG elements, where each of the FBG elements applies a respective phase shift to the PSA stage I optical signal.

In any of the disclosed embodiments, the optical system may further include a feedback control loop from the PSA stage II to the FBG, where the feedback control loop is used to spectrally align the first phase shift over the range of $2\pi$ radians.

Other disclosed aspects include an optical phase-sensitive amplifier with FBG phase shifter, a method for phase-sensitive amplification of optical signals with FBG shifters, as well as an optical network including optical phase-sensitive amplifiers with FBG phase shifters.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Figure 1:
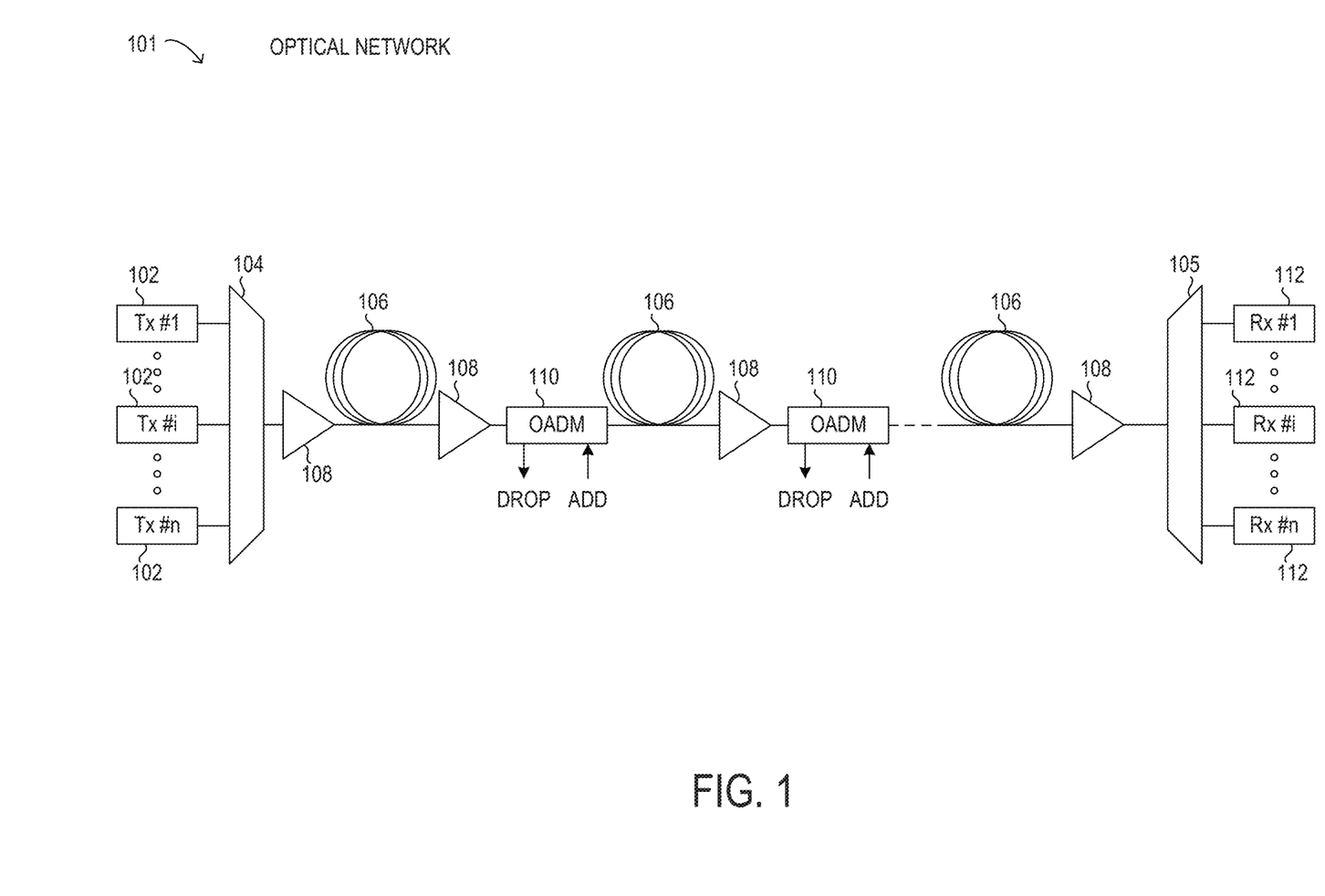
FIG. 1 is a block diagram of selected elements of an embodiment of an optical network.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal. Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (see also FIG. 2) that may be included in a ROADM. ROADMs are considered 'colorless' when the ROADM is able to add/drop any arbitrary wavelength. ROADMs are considered 'directionless' when the ROADM is able to add/drop any wavelength regardless of the direction of propagation. ROADMs are considered 'contentionless' when the ROADM is able to switch any contended wavelength (already occupied wavelength) to any other wavelength that is available.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, as data rates approach 1T and beyond, a correspondingly high OSNR becomes desirable to maintain economic feasibility by avoiding excessive numbers of O-E-O regenerators. One source of OSNR reduction is the noise accumulation resulting from cascaded optical amplifiers 108 at various points in the transmission path. For an optical amplifier, OSNR may be represented as a noise figure (NF), given by Equation 1, where $OSNR_{in}$ is the input OSNR, $OSNR_{out}$ is the output OSNR, and dB is decibels.

$$NF=10\ \log(OSNR_{in}/OSNR_{out})=OSNR_{in}[dB]-OSNR_{out}[dB] \quad \text{Equation (1)}$$

Current designs for optical amplifiers may include optical phase-sensitive amplifiers (PSA), which may exhibit a low noise figure, such as less than 3 dB in many instances. Some PSA designs, such as using fiber Bragg grating phase shifters as disclosed herein, may exhibit a lower noise figure than 3 dB noise figure, such as less than 2 dB noise figure, or less than 1 dB noise figure. The lower noise figure may enable an increased optical reach for a given optical signal, which is desirable.

A typical phase-sensitive optical amplifier will have different stages, including an idler stage to initially generate an idler signal using an optical pump and an amplification stage to amplify the input signal using the optical pump light and the idler signal. In between the idler stage and the amplification stage, an intermediate stage may be implemented in the phase-sensitive optical amplifier. The intermediate stage may involve complex signal processing and pump power recovery to adjust the power level of the input signal and the idler signal. In typical phase-sensitive optical amplifiers, the optical paths of the input signal, the optical pump light, and the idler signal may be separated in the intermediate stage in order to independently modulate power of each of the signals.

When the separated optical paths are recombined prior to the amplification stage, a phase adjustment may be performed to re-align the phase of the signals. In some embodiments, the phase adjustment may involve an optical phase lock loop to re-align the phases of the input signal and the idler signal with the optical pump light. However, a phase lock loop may not provide the desired stability and robust operation that is desired for optical networking, for example, when synchronization is lost and must be reset.

Fiber Bragg gratings (FBG) are a type of specialized reflector that may be constructed using periodic variations in an optical fiber. The FBG may be constructed to reflect a relatively narrow wavelength band, and is also used as a notch filter, accordingly. Thus, FBGs may have relatively wide transmission bands that allow for transmission of certain bandwidths, such as the optical signals described above. In addition, FBGs may provide a certain degree of phase shift in the transmission band. The phase shift provided by an FBG may further be tunable, for example, by controlling the temperature of the optical fiber, or by applying a certain amount of strain to the optical fiber.

As will be described in further detail, methods and systems are disclosed herein for implementing a phase-sensitive amplifier (PSA) with FBG phase shifter. The PSA with FBG phase shifter disclosed herein may be implemented using an FBG with multiple FBG elements, where each FBG element corresponds to a particular channel or group of channels. Then using either temperature or strain control of the optical fiber, the PSA with FBG phase shifter disclosed herein may enable phase matching of optical signals and pump signals. The PSA with FBG phase shifter disclosed herein may be used to provide a PSA having 0 dB noise figure, which may, in turn, enable extension of the reach of optical signals transmitted over optical networks.

Figure 2A:
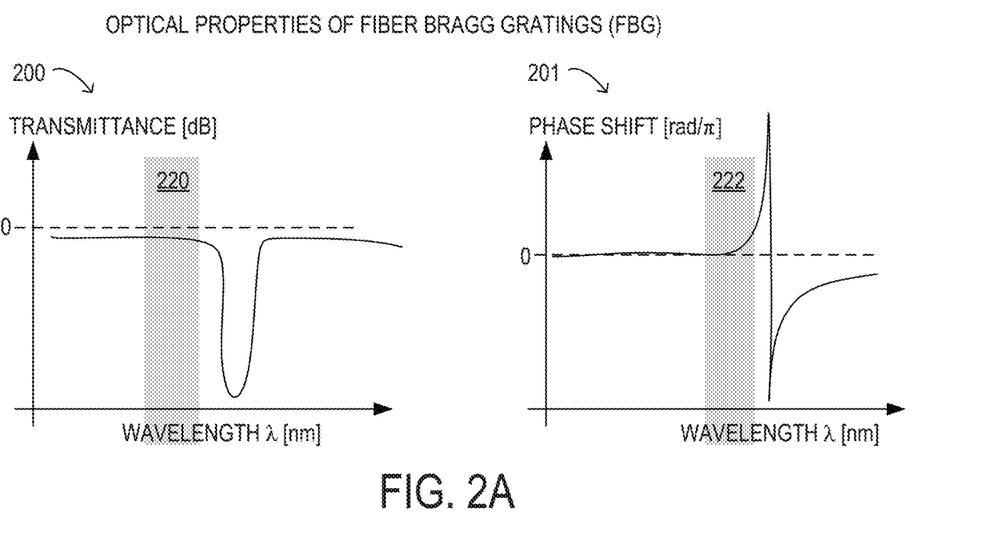
FIG. 2A depicts plots of example optical properties of fiber Bragg gratings (FBG)

FIG. 2A depicts plots of example optical properties of fiber Bragg gratings (FBGs). Specifically, a plot 200 shows transmittance versus wavelength for an FBG. Plot 200 is a schematic illustration and does not show actual measured data. However, plot 200 illustrates the notch filter characteristics of an FBG, in which the transmittance is reduced for a relatively narrow wavelength band. Also depicted in plot 200 is an example of a transmittance band 220 that may be utilized for the PSA with FBG phase shifter disclosed herein. As shown, transmittance band 220 is located in a region having close to 0 dB (100%) transmittance, but adjacent to the notch filter reflectance band. When wavelengths corresponding to transmittance band 220 are passed through an FBG, the wavelengths will be transmitted with relatively small amounts of attenuation of optical power. In other words, the FBG may appear transparent for wavelengths in transmittance band 220. Because the particular construction of the FBG may be selected such that transmittance band 220 falls along a desired wavelength subrange, multiple FBGs may be constructed in a sequential manner (see also FIG. 5) along an optical fiber for use with a desired set of optical signals, such as a WDM signal.

Also shown in FIG. 2A is plot 201, which shows phase shift for the same FBG referred to in plot 200, over the same range of wavelengths. Specifically, transmittance band 220 in plot 200 corresponds to the same wavelength range as phase shift band 222. In phase shift band 222, a discrete amount of phase shift may be added. Also, for other wavelengths smaller than in phase shift band 222, the phase shift is zero or substantially zero, while the transmittance is close to 0 dB, which allows for pass through of other frequencies without having a phase shift applied by the FBG. Furthermore, the value of the phase shift in plot 201 may be varied slightly in wavelength by applying temperature or strain to the fiber, which can also be used to tune the amount of phase shift applied to a given wavelength within phase shift band 222. Because the actual phase shift applied at phase shift band 222 may be tuned, such as by using temperature or strain control of the FBG, the FBG may be used for phase shifting or phase adjustment in a PSA.

In summary, the optical properties shown in FIG. 2A describe how a FBG may be used in an optical fiber for phase shifting. The construction of the FBG, for example with multiple individual FBG elements, may determine the frequency subband of transmittance band 220 and phase shift band 222. Then, temperature or strain control at an individual FBG element may be used to tune the amount of phase shift at the individual FBG element. In this manner, the FBG may be used for phase shifting in an optical PSA, as described in further detail below.

Figure 2B:
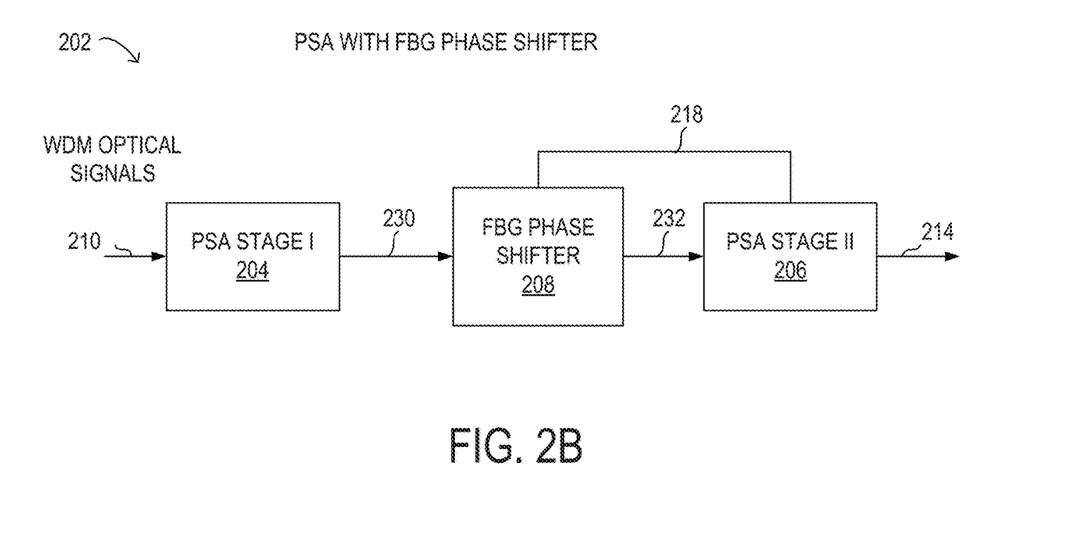
FIG. 2B is a block diagram of selected elements of an embodiment of an optical phase-sensitive amplifier with FBG phase shifter.

FIG. 2B is a block diagram of selected elements of an embodiment of an optical PSA with FBG phase shifter 202. In PSA 202, a WDM optical signal 210 may be received by a PSA stage I 204. In PSA stage I 204, simple four wave mixing (FWM) may occur to generate so-called "idler signals", which are conjugate wavelengths of an optical signal, such as WDM optical signal 210, relative to a pump light. In FWM, the idler signals appear when the optical signal and the pump light are passed through a non-linear element (NLE), such as a highly non-linear fiber (HNLF). In various embodiments, other NLEs may also be used to facilitate FWM, such as optical crystals or other optical materials. In the NLE, photons are converted from the pump light and the optical signal to the idler signal by non-linear processes.

Accordingly, PSA stage I outputs a PSA stage I optical signal 230, in which the intensity of the pump light and the optical signal is diminished, but in which the idler signals have been added. Conjugate idler signals may appear in PSA stage I optical signal 230 for each channel in the WDM optical signal 210. It is noted that PSA stage I 204 may be used with an input signal that includes a single optical channel.

Then, in PSA with FBG phase shifter 202, PSA stage I optical signal 230 may be received by FBG phase shifter 208, which is described in further detail below with respect to FIG. 5. In FBG phase shifter 208, the phase of at least one of the pump light, WDM optical signal 210, and the idler signals may be adjusted. The phase shift applied by FBG phase shifter 208 may be controlled using a feedback loop 218 that enables monitoring of output WDM output signal 214 for precise phase alignment. For example, power variations in output WDM output signal 214 may be observed to be minimized when the output of FBG phase shifter 208, a PSA stage II optical signal 232, is precisely phase-matched with respect to the WDM optical signal 210, the pump light, and the idler signals.

Finally, in PSA with FBG phase shifter 202, a PSA stage II 206 may receive PSA stage II optical signal 232 and may amplify WDM optical signal 210. PSA stage II 206 may also include Raman amplification, as well as other elements described in further detail below, in order to generate output WDM output signal 214, in which the channels have been amplified relative to input WDM optical signal 210.

Figure 3:
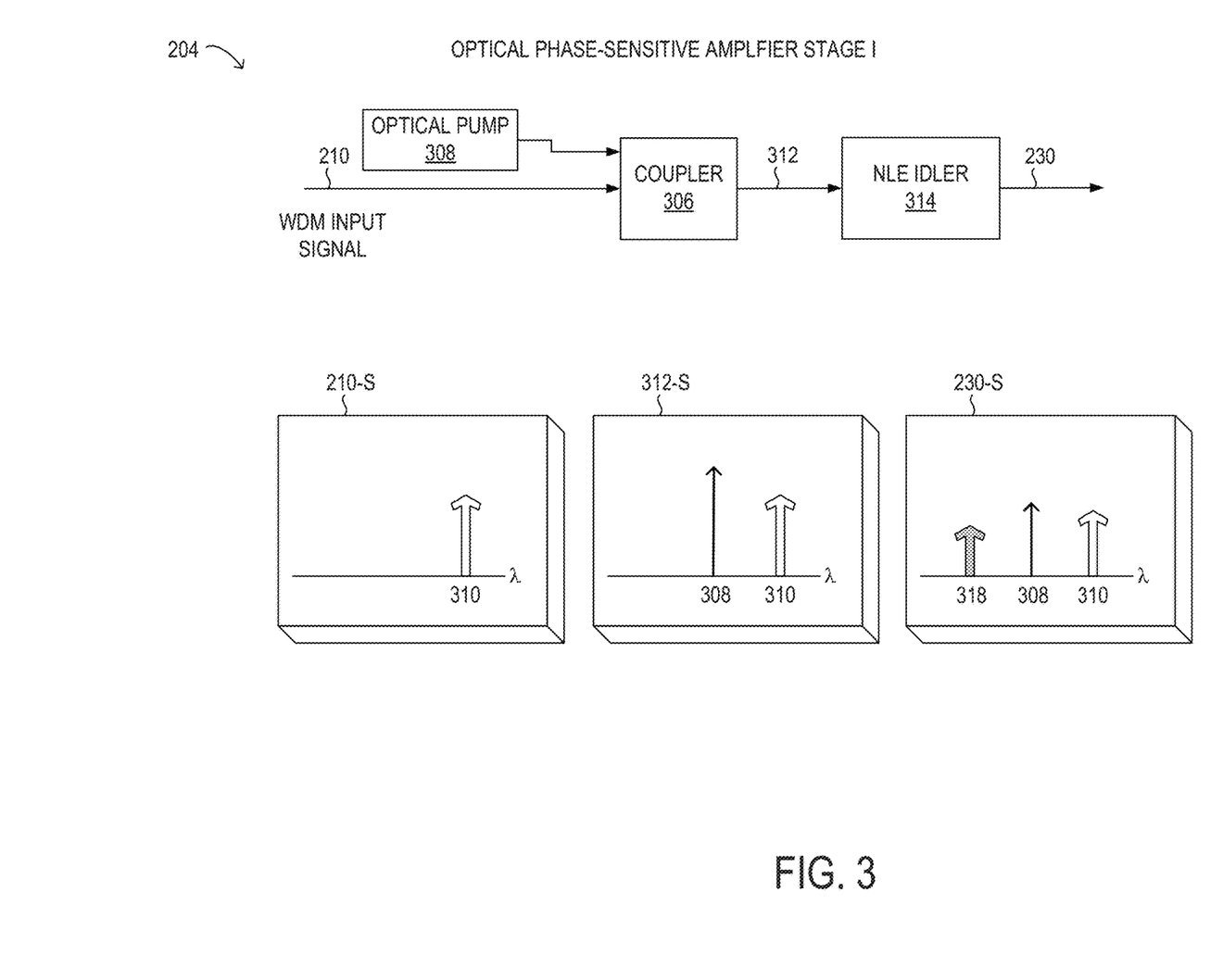
FIG. 3 is a block diagram of selected elements of an embodiment of a phase-sensitive optical amplifier stage I.

Referring now to FIG. 3, selected elements of an embodiment of an optical PSA stage I 204 are depicted. In FIG. 3, optical PSA stage I 204 is shown in a schematic representation and is not drawn to scale. It is noted that, in different embodiments, optical PSA stage I 204 may be operated with additional or fewer elements as shown in FIG. 3.

In FIG. 3, optical PSA stage I 204 receives WDM input signal 210 and adds optical pump light 308 using coupler 306. Intermediate stage I signal 312, comprising WDM input signal 210 and optical pump light 308 are then sent to NLE idler 314, which is a non-linear optical element. In the presence of optical pump light 308 and WDM input signal 210, simple four wave mixing (FWM) may occur at NLE idler 314 to generate idler signals 318, resulting in PSA stage I optical signal 230, as described above with respect to FIG. 2B.

Also shown in FIG. 3 are spectra of the different signals transmitted in optical PSA stage I 204. In spectra 210-S, optical signal 310 represents one or more wavelengths included in WDM input signal 210. In spectra 312-S, corresponding to intermediate stage I signal 312, optical pump light 308 is added to optical signal 310. In spectra 230-S corresponding to PSA stage I optical signal 230, idler signal 318 has been added, representing corresponding one or more wavelengths of optical signal 310, but spectrally spaced symmetrically with respect to optical pump light 308. Also, the optical power of the signals in spectra 230-S has been reduced, which is indicative of FWM to generate idler signal 318.

Figure 4:
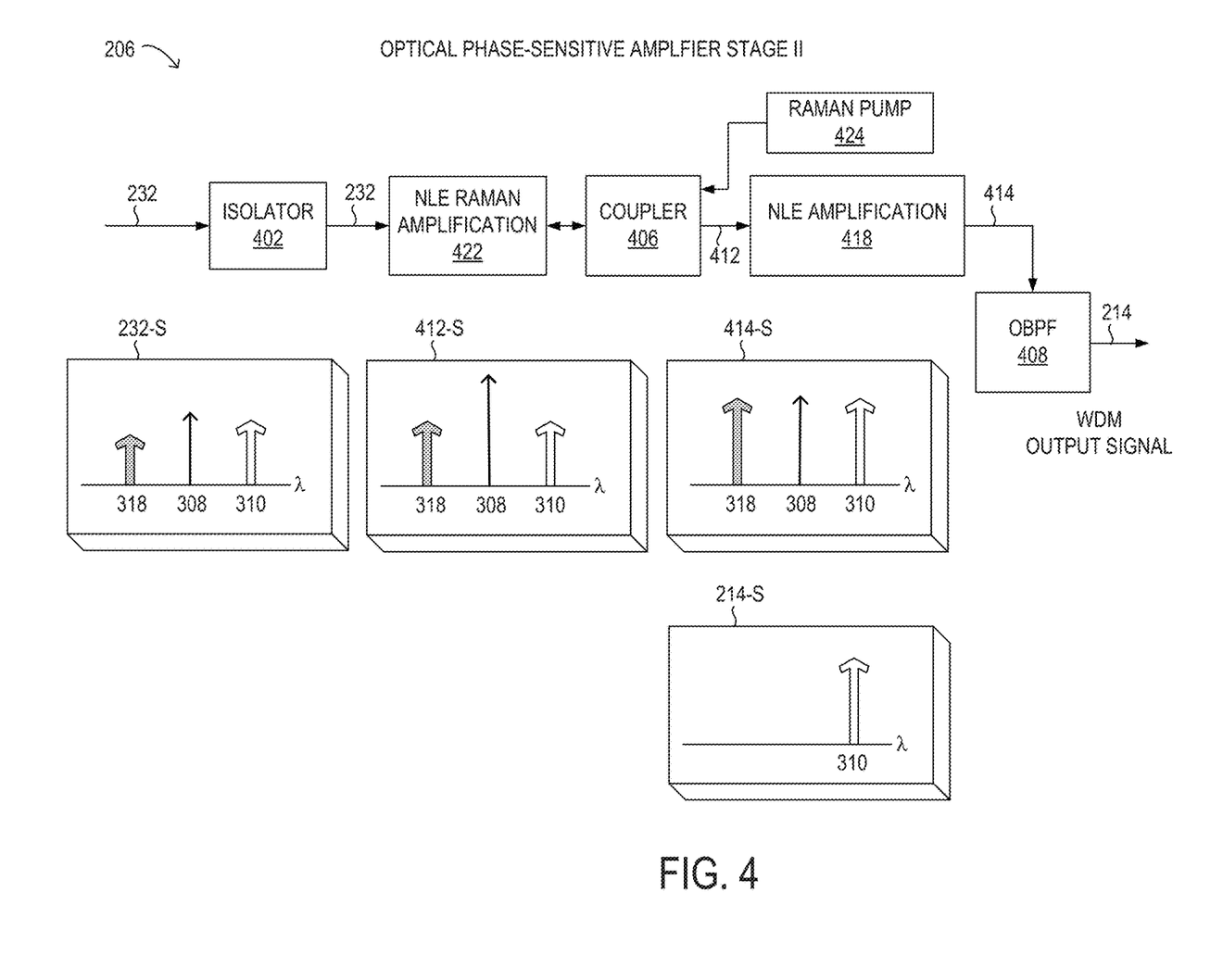
FIG. 4 is a block diagram of selected elements of an embodiment of a phase-sensitive optical amplifier stage II.

Referring now to FIG. 4, selected elements of an embodiment of an optical PSA stage II 206 are depicted. In FIG. 4, optical PSA stage II 206 is shown in a schematic representation and is not drawn to scale. It is noted that, in different embodiments, optical PSA stage II 206 may be operated with additional or fewer elements as shown in FIG. 4.

In FIG. 4, optical PSA stage II 206 receives PSA stage II optical signal 232 from FBG phase shifter 208. Accordingly, the signals in PSA stage II optical signal 232 may be phase matched by FBG phase shifter 208, as disclosed herein. PSA stage II optical signal 232 may be passed through isolator 402 to prevent back propagation of Raman pump 424, before sending PSA stage II optical signal 232 to NLE Raman amplification 422, which receives Raman pump 424 using coupler 406 in a counter propagating direction. PSA stage II optical signal 232 may include optical signal 310, which comprises the wavelengths in input WDM optical signal 210, as described above, along with corresponding idler signals 318 and optical pump light 308. As noted, optical signals shown in spectra 232-S may be phase matched, or phase aligned, using FBG phase shifter 208 for optimal operation of PSA stage II 206.

In optical PSA stage II 206, NLE Raman amplification 422 may comprise a Raman amplifier that includes Raman pump 424, which may be a laser source, that is directed through an NLE as a gain medium in a counter propagation direction to the optical signal being processed (PSA stage II optical signal 232). Raman pump 424 may be selected based on the gain medium used. For example, a 13 THz optical pump may be used with $GeO_2/SiO_2$ single mode fibers (SMF) as the NLE, while a 40 THz optical pump may be used with $P_2O_5$-doped $SiO_2$ phosphate-doped fiber (PDF) as the NLE in NLE Raman amplification 422. Furthermore, modulation or modification of the optical power of Raman pump 424 may be used to determine or modify an optical gain of NLE Raman amplification 422. It is noted that Raman amplification may be optional in some embodiments of optical PSA stage II 206, such that isolator 402, NLE Raman amplification 422, coupler 406, and Raman pump 424 may be omitted (not shown).

The output of NLE Raman amplification 422 is shown as Raman amplified optical signal 412, which is directed to NLE amplification 418, which is a non-linear optical element. In the presence of Raman amplified optical signal 412, one-pump four wave mixing (FWM) may occur at NLE amplification 418 to amplify the WDM optical signal and the idler signals, at the expense of optical pump light 308. NLE amplification 418 may include components for performing one-pump optical four-wave mixing (FWM). The one-pump FWM may be accomplished by passing the input signal, or filtered portions thereof, through a non-linear optical element (NLE), such as a doped optical fiber, periodically poled lithium niobate (PPLN), aluminium gallium arsenide (AlGaAs) or other semiconductor material that exhibits desired optical non-linearity.

After NLE amplification 418, optical signal 414 includes the amplified WDM optical signals and idler signals, along with the diminished optical pump light 308. An optical bandpass filter (OBPF) 408 may then be applied to isolate WDM output signal 214.

Also shown in FIG. 4 are spectra of the different signals transmitted in optical PSA stage II 206. In spectra 232-S, optical signal 310 represents one or more wavelengths included in WDM output signal 214, while idler signals 318 are conjugates of optical signal 310 with respect to optical pump light 308. As noted, optical signals shown in spectra 232-S may be phase matched, or phase aligned, using FBG phase shifter 208 for optimal operation of PSA stage II 206.

In spectra 412-S, corresponding to Raman amplified optical signal 412, optical signal 310, optical pump light 308, and idler signals 318 may be amplified (shown with increased signal intensity). In spectra 414-S, optical signal 310 and idler signals 318 may be amplified at the expense of optical pump light 308, corresponding to FWM. In spectra 214-S, optical signal 310 is isolated in amplified form to generate WDM output signal 214.

Figure 5:
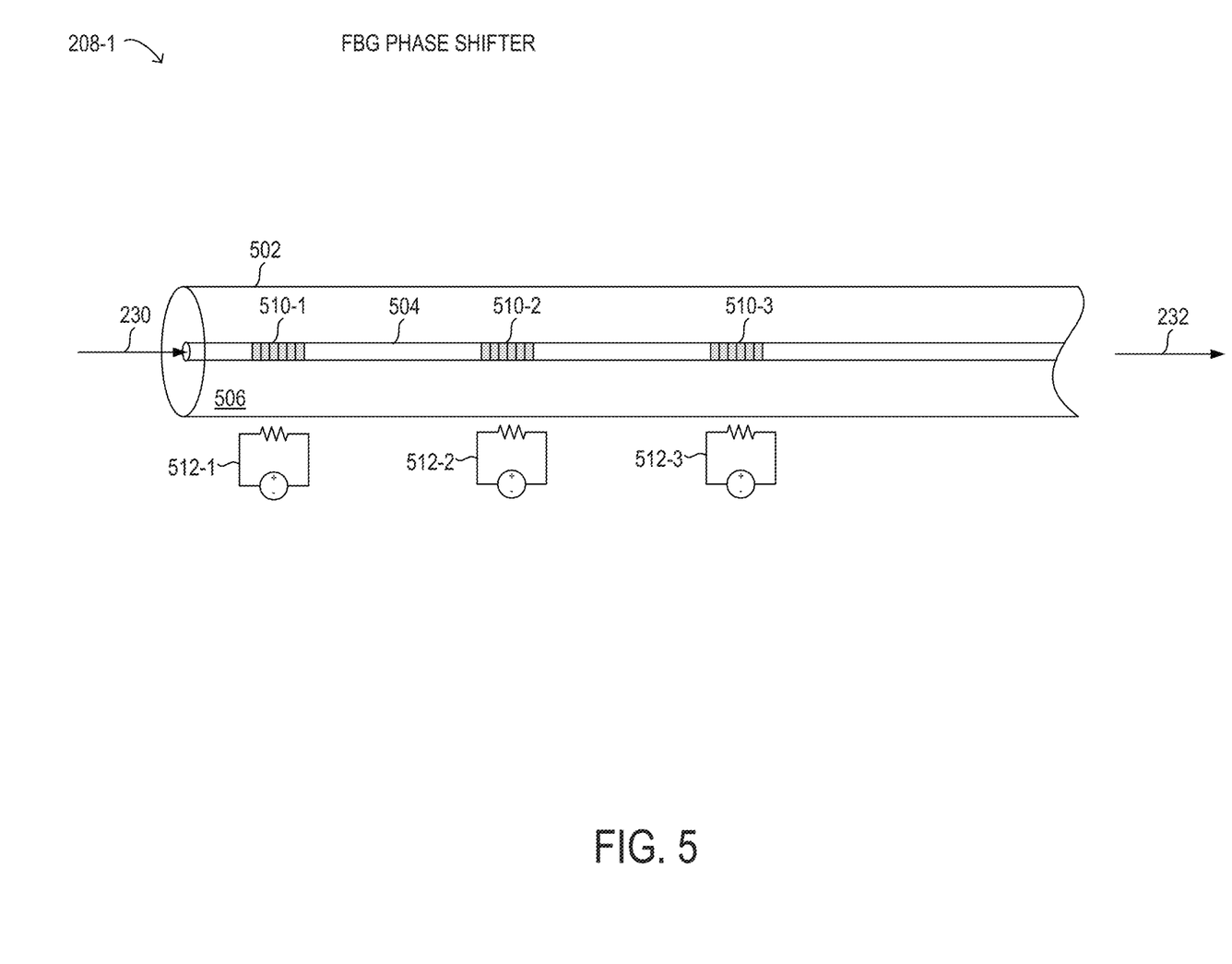
FIG. 5 is a diagram of selected elements of an embodiment of an FBG phase shifter.

FIG. 5 is a diagram of selected elements of an embodiment of an FBG phase shifter 208-1. FIG. 5 is a schematic illustration and is not drawn to scale or perspective. In FIG. 5, FBG phase shifter 208-1 comprises an optical fiber 502 and is enabled to receive PSA stage I optical signal 230 and to output PSA stage II optical signal 232, as described previously. Optical fiber 502 in FBG phase shifter 208-1 is further comprised of a cladding 506 and a fiber core 504 that transmits optical signals due to differences in the index of refraction within optical fiber 502.

Within fiber core 504, a plurality of FBG elements 510 are shown, including FBG elements 510-1, 510-2, and 510-3. FBG elements 510 are shown equivalent in FIG. 5 for descriptive clarity, however, each individual FBG element 510 may be particularly designed or constructed to transmit a range of wavelengths, for example, corresponding to wavelengths in PSA stage I optical signal 230 (and PSA stage II optical signal 232), as described previously. In some embodiments, each individual channel or wavelength may be phase shifted using an individual FBG element 510.

Also shown in FIG. 5 are heating devices 512 corresponding to each individual FBG element 510. Specifically, heating device 512-1 may be used to individually control temperature of FBG element 510-1; heating device 512-2 may be used to individually control temperature of FBG element 510-2; and heating device 512-3 may be used to individually control temperature of FBG element 510-3. Heating devices 512 may also include a temperature sensor and control logic (not shown), such as a microcontroller or microprocessor having access to a non-transitory memory media storing executable instructions to perform temperature control for a corresponding FBG element 510. Accordingly, each FBG element 510/heating device 512 pair may operate independently with regard to temperature control, in order to provide individual phase shifting, such as within phase shift band 222 (see FIG. 2A). Because the phase shift of each FBG element 510 is dependent on temperature, in this manner, the phase shift applied to each FBG element 510 may be controlled as desired.

In other embodiments, heating device 512 may be replaced, or augmented, with a strain control device (not shown), such as a tension element (i.e., a tensioner) that applies a defined tension to optical fiber 502 at a location corresponding to the location of FBG element 510 along optical fiber 502. Because the phase shift of each FBG element is also dependent on strain in fiber core 504, the phase shift applied to each FBG element 510 may be controlled as desired using the tension elements. In some embodiments, a combination of temperature and strain control of FBG elements 510 may be used.

In one example, operation of FBG phase shifter 208-1 may include adjusting the phase of idler signals 318. For example, it may be assumed that FBG phase shifter 208-1 receives, as input, signals and wavelengths corresponding to PSA stage I optical signal 230 having 3 channels and corresponding to spectra 230-S (see FIG. 3). Accordingly, optical signals 310 and idler signals 318 have 3 channels each that are spectrally symmetric about optical pump light 308, and which can be pre-calculated when the wavelengths of the optical pump light 308 and optical signals 310 is known. In order to apply FBG phase shifter 208-1 to the 3 idler signals 318, each individual FBG element 510 may be formed to a corresponding wavelength of the individual idler signal 318. For example, FBG element 510-1 may be formed such that its phase shift band 222 corresponds to a first idler signal 318, FBG element 510-2 may be formed such that its phase shift band 222 corresponds to a second idler signal 318, and FBG element 510-3 may be formed such that its phase shift band 222 corresponds to a third idler signal 318. In this manner, FBG elements 510 may be formed to be selective to individual ones of the idler signals 318, while being transparent to the other idler signals. Then, after optical fiber 502 with the 3 FBG elements 510 has been formed and the wavelengths corresponding to spectra 230-S are transmitted through optical fiber 502, a base calibration of heating elements 512 may be performed, such that each heating element 512 is at a temperature that corresponds to a known output of FBG elements 510. The output of FBG phase shifter 208-1 may then be routed through PSA stage II 206 to generate WDM output signals 214. Then, an output of PSA with FBG phase shifter 202, namely WDM output signal 214, may be monitored for optical power, while the phase of each FBG element 510 is tuned using heating elements 512. For example, a temperature change of about 40° C. may result in a phase shift of about 1 nm in wavelength at FBG element 510. Heating elements 512 may be tuned to respective temperatures such that an optical power of WDM output signal 214 is maximized, which will occur when all phases in idler signals 318 are aligned.

Figure 6:
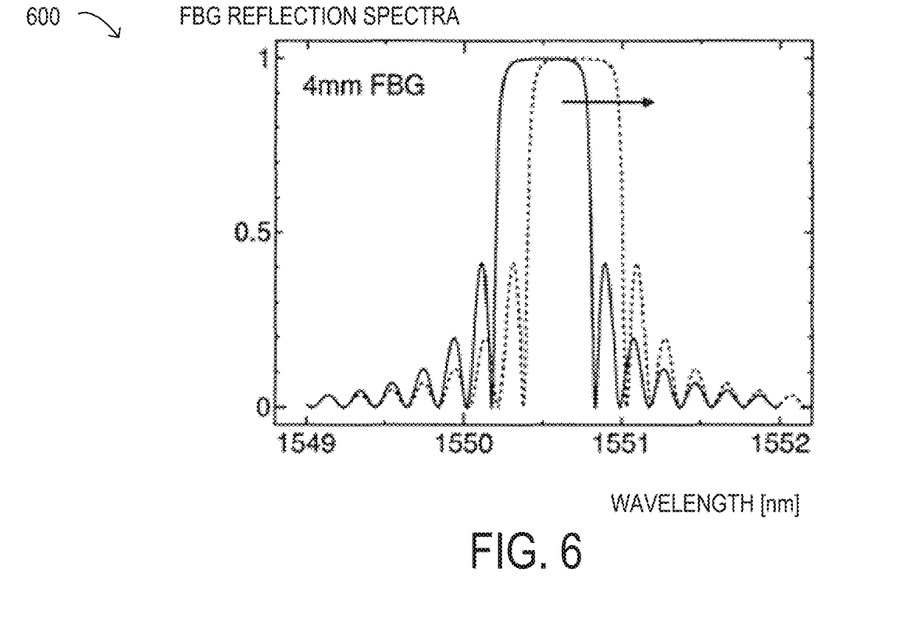
FIG. 6 depicts plots of FBG reflection spectra.

Referring now to FIG. 6, FBG reflection spectra 600 are depicted in a plot. In FIG. 6, FBG reflection spectra 600 show the numerous sidebands, or ripple, that occur on each side of a primary reflection peak. When reflection occurs in an FBG, a phase change also occurs, as described previously. When the numerous sidebands are present, damped oscillation may occur, which may result in an unpredictable or unmatched phase shift. However, if the ripple around the primary reflection peak was controlled, such as by using an apodization function on the FBG, then the phase shift around the reflection bandwidth would also be controlled. By using an apodization function that results in a limited number of sidebands, the sideband region could be used as a low loss phase shifter without any damping from reflection.

Figure 7:
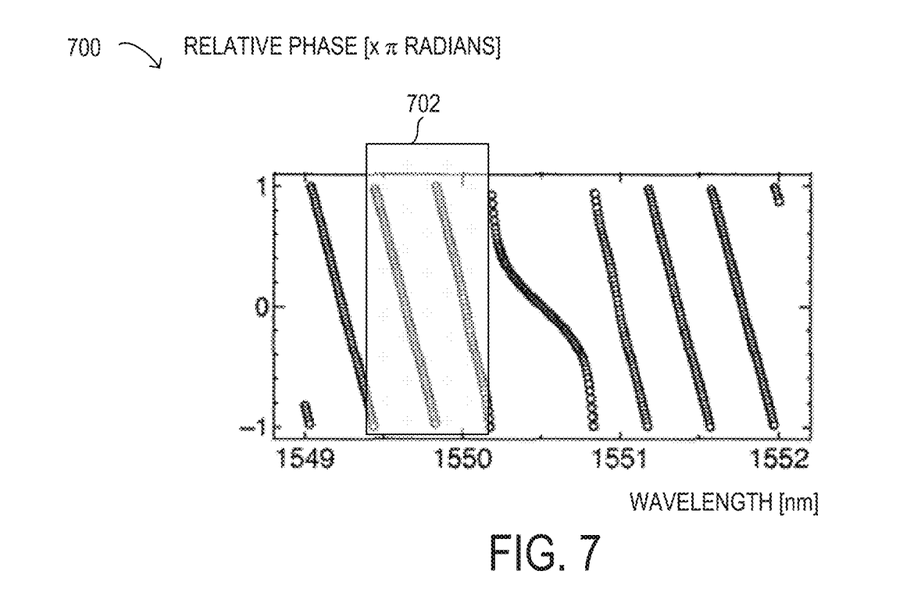
FIG. 7 depicts plots of relative phase shift versus wavelength for FBG reflection spectra.

In FIG. 7, a plot 700 of relative phase versus wavelength for FBG reflection spectra 600 are shown. In plot 700, sideband region 702 shows that a linear phase shift extending over a $2\pi$ period is available for phase shifting, such as by FBG phase shifter 208 in PSA 202, using a suitable apodization function.

Figure 8:
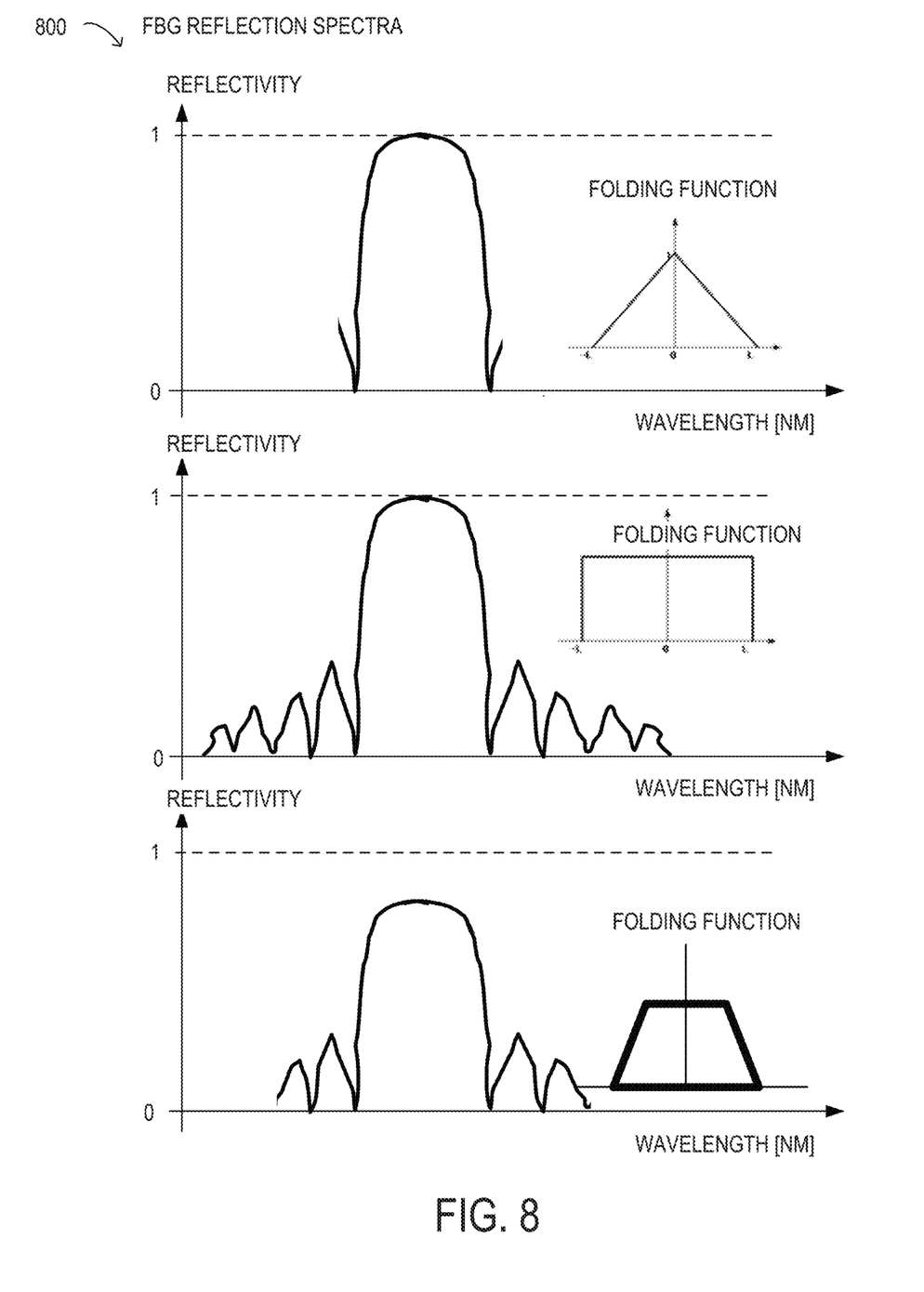
FIG. 8 depicts plots of FBG reflection spectra for different apodization functions.

In FIG. 8, FBG reflection spectra 800 are shown for different types of apodization. As used herein, 'apodization' of an FBG refers to a process of grading the index of refraction difference between alternating FBG materials over the length of the FBG, such that the difference is zero (or near zero) at the ends of the FBG. For example, to construct an FBG, an optical fiber (e.g., a germanium-doped silica fiber) may be irradiated (e.g., using a UV laser) at particular locations along the optical fiber to increase the refractive index of the optical fiber core within stripes created by the irradiation at the targeted locations. This creates a larger refractive index difference between the FBG core and clad materials at the irradiated locations than at locations that have not been irradiated. The scale of the change in the refractive index at each irradiated location depends on the power (i.e. the intensity of the laser) and the duration of the irradiation. If the irradiation power and duration are constant, a uniform grating would be constructed. However, the reflection characteristics of the FBG can be modified by changing the power and/or duration of the irradiation at specific locations along the optical fiber. For example, if the time of irradiation at a first location is double the time of irradiation at a second location, the refractive index difference at that location would be double that of the refractive index difference at the second location. Different irradiation patterns or functions, some of which may effect an apodization, may be applied during construction of an FBG to induce particular reflection characteristics of the FBG.

In FIG. 8, FBG reflection spectra resulting from different types of apodization functions are shown. Apodization may be beneficial for filtering a specific wavelength range. Without apodization, loss ripple remains in the FBG reflection spectra and may result in damped oscillation, while a phase change versus wavelength is still observed. As a result of the damped oscillation, relative phase control between different wavelengths may be prevented or diminished.

In the top plot of FIG. 8, a triangular apodization is shown that eliminates all sidebands of the FBG reflection peak.

This triangular apodization may eliminate the sideband that can be used for phase adjustment, which is not desirable for phase shift control.

In the middle plot of FIG. 8, a flat apodization that is effectively no apodization is shown, and all sideband ripples remain in the FBG reflection spectra, which is not desirable for phase shift control.

In the lower plot of FIG. 8, a trapezoidal apodization is shown that preserves a small number of sidebands in a spectral region that can be used for phase control, and can provide an entire $2\pi$ radians period of linear or nearly linear phase shifting available for tuning, e.g., by controlling the temperature and/or tension, as described above (see also FIG. 7).

Figure 9:
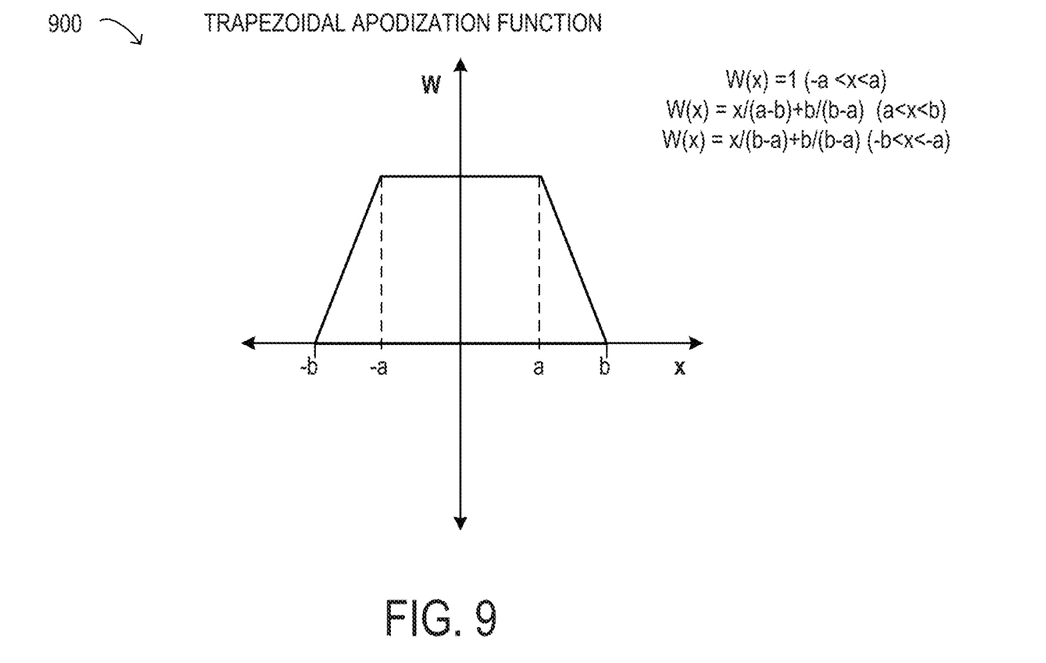
FIG. 9 depicts a plot of a trapezoidal apodization function.

Referring now to FIG. 9, a trapezoidal apodization function 900 is shown. The trapezoidal apodization function 900 would result in three regions along an optical axis of the FBG, given by the x-axis in FIG. 9. In FIG. 9, the y-axis is an index of refraction difference function W(x) that is represented along the FBG optical axis given by the x-axis. The trapezoidal apodization function may be accordingly defined in three segments as given by Equation 2.

$$[-b > x > -a]: W(x) = \frac{x}{(b-a)} + \frac{b}{(b-a)}$$

$$[-a > x > a]: W(x) = 1$$

$$[a > x > b]: W(x) = \frac{x}{(a-b)} + \frac{b}{(b-a)}$$

Equation (2)

Figure 10:
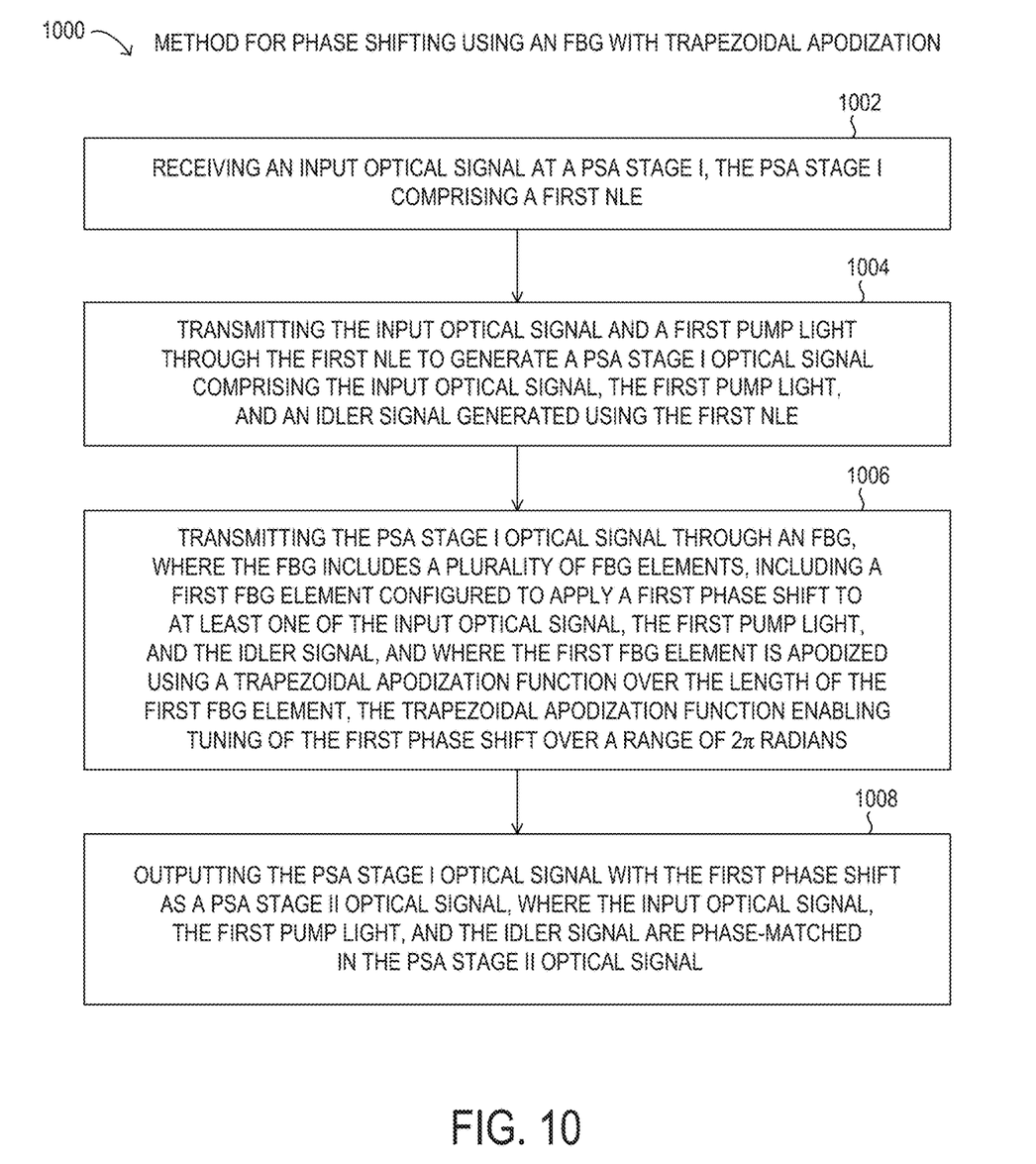
FIG. 10 is a flowchart of selected elements of an embodiment of a method for phase shifting using an FBG with trapezoidal apodization.

Referring now to FIG. 10, a flowchart of selected elements of an embodiment of method 1000 for FBG phase shifting using an FBG with trapezoidal apodization, as described herein, is depicted. Method 1000 may be performed using PSA 202, which may communicate with various components in optical transport network 101, as described above. It is noted that certain operations described in method 1000 may be optional or may be rearranged in different embodiments.

Method 1000 may begin at step 1002 by receiving an input optical signal at a PSA stage I, the PSA stage I comprising a first NLE. At step 1004, the input optical signal and a first pump light are transmitted through the first NLE to generate a PSA stage I optical signal comprising the input optical signal, the first pump light, and an idler signal generated using the first NLE. At step 1006, the PSA stage I optical signal is transmitted through an FBG, where the FBG includes a plurality of FBG elements, including a first FBG element configured to apply a first phase shift to at least one of the input optical signal, the first pump light, and the idler signal, and where the first FBG element is apodized using a trapezoidal apodization function over the length of the first FBG element, the trapezoidal apodization function enabling tuning of the first phase shift over a range of $2\pi$ radians. At step 1008, the PSA stage I optical signal with the first phase shift is output as a PSA stage II optical signal, where the input optical signal, the first pump light, and the idler signal are phase-matched in the PSA stage II optical signal.

As disclosed herein, an FBG element is configured to apply a phase shift to at least one of an input optical signal, a first pump light, and an idler signal between stages of a phase sensitive amplifier. The FBG element is apodized using a trapezoidal apodization function over the length of the first FBG element to enable tuning of the phase shift over a range of $2\pi$ radians.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An optical system for phase-sensitive amplification of optical signals, the optical system comprising:
   an input optical signal;
   a phase-sensitive amplifier (PSA) stage I receiving the input optical signal, wherein the PSA stage I comprises a first non-linear optical element (NLE) through which the input optical signal and a first pump light are passed to generate a PSA stage I optical signal comprising the input optical signal, the first pump light, and an idler signal generated using the first NLE; and
   a fiber Bragg grating (FBG) receiving the PSA stage I optical signal, wherein:
      the FBG includes a plurality of FBG elements, including a first FBG element configured to apply a first phase shift to at least one of the input optical signal, the first pump light, and the idler signal;
      the first FBG element is apodized using a trapezoidal apodization function over the length of the first FBG element, the trapezoidal apodization function enabling tuning of the first phase shift over a range of 2n radians;
      the FBG outputs the PSA stage I optical signal with the first phase shift as a PSA stage II optical signal; and
      the input optical signal, the first pump light, and the idler signal are phase-matched in the PSA stage II optical signal.

2. The optical system of claim 1, further comprising:
   a PSA stage II receiving the PSA stage II optical signal, wherein the PSA stage II comprises a second NLE through which the PSA stage II optical signal is amplified to generate an output optical signal.

3. The optical system of claim 2, wherein the PSA stage II further comprises:
   a Raman amplifier; and
   a second pump light for transmission through the Raman amplifier in a counter propagating direction to the PSA stage II signal.

4. The optical system of claim 1, wherein the input optical signal comprises at least one of:
   one optical channel, and wherein the first FBG element applies the first phase shift to the first pump light; and
   a wavelength division multiplexed (WDM) optical signal, including a first optical channel, and wherein the first FBG element applies the first phase shift to a first idler signal that is a conjugate of the first optical channel.

5. The optical system of claim 1, further comprising at least one of:
   a first heating element associated with the first FBG element, wherein the first heating element is used to control a local temperature of the first FBG element to control the first phase shift; and
   a first tension element associated with the first FBG element, wherein the first tension element is used to control a local strain of the first FBG element to control the first phase shift.

6. The optical system of claim 1, further comprising:
a feedback control loop from the PSA stage II to the FBG, wherein the feedback control loop is used to spectrally align the first phase shift over the range of 2n radians.

7. A phase-sensitive amplifier, comprising:
a phase-sensitive amplifier (PSA) stage I receiving an input optical signal, wherein the PSA stage I comprises a first non-linear optical element (NLE) through which the input WDM optical signal and a first pump light are passed to generate a PSA stage I optical signal comprising the input optical signal, the first pump light, and an idler signal generated using the first NLE; and
a fiber Bragg grating (FBG) receiving the PSA stage I optical signal, wherein:
the FBG includes a plurality of FBG elements, including a first FBG element configured to apply a first phase shift to at least one of the input optical signal, the first pump light, and the idler signal;
the first FBG element is apodized using a trapezoidal apodization function over the length of the first FBG element, the trapezoidal apodization function enabling tuning of the first phase shift over a range of 2n radians;
the FBG outputs the PSA stage I optical signal with the first phase shift as a PSA stage II optical signal; and
the input optical signal, the first pump light, and the idler signal are phase-matched in the PSA stage II optical signal.

8. The phase-sensitive amplifier of claim 7, further comprising:
a PSA stage II receiving the PSA stage II optical signal, wherein the PSA stage II comprises a second NLE through which the PSA stage II optical signal is amplified to generate an output optical signal.

9. The phase-sensitive amplifier of claim 8, wherein the PSA stage II further comprises:
a Raman amplifier; and
a second pump light for transmission through the Raman amplifier in a counter propagating direction to the PSA stage II signal.

10. The phase-sensitive amplifier of claim 7, wherein the input optical signal comprises at least one of:
one optical channel, and wherein the first FBG element applies the first phase shift to the first pump light; and
a wavelength division multiplexed (WDM) optical signal, including a first optical channel, and wherein the first FBG element applies the first phase shift to a first idler signal that is a conjugate of the first optical channel.

11. The phase-sensitive amplifier of claim 7, further comprising at least one of:
a first heating element associated with the first FBG element, wherein the first heating element is used to control a local temperature of the first FBG element to control the first phase shift; and
a first tension element associated with the first FBG element, wherein the first tension element is used to control a local strain of the first FBG element to control the first phase shift.

12. The phase-sensitive amplifier of claim 7, further comprising:
a feedback control loop from the PSA stage II to the FBG, wherein the feedback control loop is used to spectrally align the first phase shift over the range of 2n radians.

13. A method for phase-sensitive amplification of optical signals, the method comprising:
receiving an input optical signal at a phase-sensitive amplifier (PSA) stage I, wherein the PSA stage I comprises a first non-linear optical element (NLE);
transmitting the input optical signal and a first pump light through the first NLE to generate a PSA stage I optical signal comprising the input optical signal, the first pump light, and an idler signal generated using the first NLE;
transmitting the PSA stage I optical signal through a fiber Bragg grating (FBG), wherein the FBG includes a plurality of FBG elements, including a first FBG element configured to apply a first phase shift to at least one of the input optical signal, the first pump light, and the idler signal, and wherein the first FBG element is apodized using a trapezoidal apodization function over the length of the first FBG element, the trapezoidal apodization function enabling tuning of the first phase shift over a range of 2n radians; and
outputting the PSA stage I optical signal with the first phase shift as a PSA stage II optical signal, wherein the input optical signal, the first pump light, and the idler signal are phase-matched in the PSA stage II optical signal.

14. The method of claim 13, further comprising:
receiving the PSA stage II optical signal at a PSA stage II, wherein the PSA stage II comprises a second NLE through which the PSA stage II optical signal is amplified; and
generate an output optical signal at the PSA stage II.

15. The method of claim 14, wherein the PSA stage II further comprises:
a Raman amplifier; and
a second pump light for transmission through the Raman amplifier in a counter propagating direction to the PSA stage II signal.

16. The method of claim 13, wherein the input optical signal comprises at least one of:
one optical channel, and wherein the first FBG element applies the first phase shift to the first pump light; and
a wavelength division multiplexed (WDM) optical signal, including a first optical channel, and wherein the first FBG element applies the first phase shift to a first idler signal that is a conjugate of the first optical channel.

17. The method of claim 13, further comprising:
controlling a local temperature of the first FBG element to control the first phase shift using a first heating element associated with the first FBG element.

18. The method of claim 13, further comprising:
controlling a local strain of the first FBG element to control the first phase shift using a first tension element associated with the first FBG element.

19. The method of claim 13, further comprising:
spectrally aligning the first phase shift over the range of 2n radians using a feedback control loop from the PSA stage II to the FBG.

* * * * *